(12) United States Patent
Clark et al.

(10) Patent No.: US 6,405,738 B1
(45) Date of Patent: Jun. 18, 2002

(54) SPRAY CLEANING APPARATUS FOR DEEP FRYER

(75) Inventors: Allen F. Clark; Albert C. McNamara, both of San Antonio; Jack E. Garner, Stockdale; Rosendo A. Sanchez, San Antonio, all of TX (US)

(73) Assignee: Ultrafryer Systems, Inc., San Antonio, TX (US)

(*) Notice: Subject to any disclaimer, the term of this patent is extended or adjusted under 35 U.S.C. 154(b) by 0 days.

(21) Appl. No.: 09/425,342

(22) Filed: Oct. 22, 1999

(51) Int. Cl.[7] .................................................. B08B 3/02
(52) U.S. Cl. .............................. 134/115 R; 134/166 R; 134/177; 134/183; 134/201
(58) Field of Search .................................. 134/105, 108, 134/166 R, 172, 177, 175, 201, 115 R, 182, 183

(56) References Cited

U.S. PATENT DOCUMENTS

| | | | | |
|---|---|---|---|---|
| 1,631,045 A | * | 5/1927 | Macon | |
| 2,641,270 A | * | 6/1953 | Allen | |
| 3,329,529 A | * | 7/1967 | Lamar | |
| 3,373,754 A | * | 3/1968 | Squire | |
| 3,573,861 A | * | 4/1971 | Lecrone | |
| 3,593,718 A | * | 7/1971 | Sauer | |
| 3,657,011 A | * | 4/1972 | Orr | |
| 3,670,746 A | * | 6/1972 | Gehrmann | |
| 3,685,433 A | * | 8/1972 | Cunningham | |
| 3,707,907 A | * | 1/1973 | Wilson et al. | |
| 3,770,204 A | * | 11/1973 | Schuster | |
| 4,192,462 A | * | 3/1980 | Erickson | |
| 4,420,006 A | | 12/1983 | Moore et al. ................ 134/167 |
| 4,502,373 A | * | 3/1985 | Keating | |
| 4,622,135 A | * | 11/1986 | Williams | |
| 4,623,186 A | * | 11/1986 | Chavarria et al. | |
| 4,684,412 A | * | 8/1987 | Fritzsche | |
| 4,700,617 A | * | 10/1987 | Lee et al. | |
| 4,759,710 A | * | 7/1988 | Polaczy et al. | |
| 4,768,534 A | * | 9/1988 | Anderson | |
| 4,959,144 A | * | 9/1990 | Bernard et al. | |
| 5,263,504 A | * | 11/1993 | Bailey et al. | |
| 5,340,471 A | * | 8/1994 | Wilson et al. | |
| 5,597,601 A | * | 1/1997 | Griffin | |
| 5,934,869 A | * | 8/1999 | Janisse | |
| 6,182,561 B1 | * | 2/2001 | Garner et al. | |

* cited by examiner

Primary Examiner—Frankie L. Stinson
(74) Attorney, Agent, or Firm—Banner & Witcoff, Ltd.

(57) ABSTRACT

A fryer system has a vat having four sides and a bottom. A plurality of heat exchange tubes extending across the vat. A spray unit having at least one nozzle disposed above the plurality of heat exchange tubes is operably connected to a fluid supply. The spray unit is oriented to direct a flow of fluid onto the sides and bottom of the vat and onto the heat exchange tubes.

17 Claims, 7 Drawing Sheets

SPRAY CLEANING APPARATUS FOR DEEP FRYER

INTRODUCTION

The present invention relates to a spray apparatus for a deep fryer, and more particularly, to an improved spray apparatus having improved cleaning capabilities and safety features.

BACKGROUND

Deep fryers are commercially used by restaurants, institutional kitchens, and fast food establishments for cooking a variety of food products, such as french fries, fish, fried chicken, and the like. The food product is cooked by totally immersing it within a vat or tank that is filled with heated oil or shortening. The oil may be heated using a flow of heated gas that is forced or drawn through heat exchange tubes located within the cooking vat. The vat must be intermittently cleaned to remove food product which has accumulated in the vat.

The vat may be cleaned manually by directing a stream of shortening through a hose held by an operator. Since the shortening is at a high temperature, the operator must wear protective clothing such as gloves when handling the hose during the flushing operation. Manual cleaning can lead to splashing of the shortening onto the operator or other individuals, the floor, and other equipment, and is also labor intensive.

U.S. Pat. No. 4,420,006 to Moore et al. discloses a spray cleaning system having a tubular shower apparatus which discharges jets of cooking oil. However, the jets of the system of Moore are only directed along the interior wall surfaces of a vat.

It is an object of the present invention to provide a spray apparatus for a deep fryer which reduces or wholly overcomes some or all of the aforesaid difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a device for safely and efficiently cleaning the vat of a deep fryer.

In accordance with a first aspect, a spray apparatus for a fryer system has a vat having four sides and a bottom. A plurality of heat exchange tubes extend across the vat. A fluid supply port is operably connected to a supply of fluid. A spray unit has at least one nozzle disposed above the plurality of heat exchange tubes and is operably connected to the fluid supply port. The spray unit is oriented to direct a flow of fluid onto the sides and bottom of the vat and onto the heat exchange tubes.

In accordance with another aspect, a spray apparatus for a fryer system includes a plurality of vats, each vat having four sides and a bottom. A plurality of heat exchange tubes extend across each vat. A fluid supply port is operably connected to a supply of fluid. A spray unit is operably connected to the fluid supply port and has at least one nozzle. The spray unit is adapted to be positioned above a selected vat to direct a flow of fluid onto the sides and bottom of the selected vat and onto the heat exchange tubes of the selected vat.

In accordance with yet another aspect, a spray apparatus for a fryer system includes a shield having a top and four side walls extending downwardly from outer edges of the top. A fitting is located on the shield for connection to a supply of fluid. A spray unit extends downwardly from the top of the shield and is operably connected to the fitting. The spray unit has at least one nozzle oriented to direct fluid outwardly and downwardly from the nozzle.

From the foregoing disclosure, it will be readily apparent to those skilled in the art, that is, those who are knowledgeable or experienced in this area of technology, that the present invention provides a significant technological advance. Preferred embodiments of the invention can provide an efficient, effective and safe way of cleaning the vat of a deep fryer. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

The figures referred to above are not drawn necessarily to scale and should be understood to present a representation of the invention, illustrative of the principles involved. Some features of the spray cleaning apparatus depicted in the drawings have been enlarged or distorted relative to others to facilitate explanation and understanding. Spray cleaning apparatus, as disclosed herein, will have configurations and components determined, in part, by the intended application and environment in which they are used.

DETAILED DESCRIPTION OF CERTAIN PREFERRED EMBODIMENTS

Figure 1:
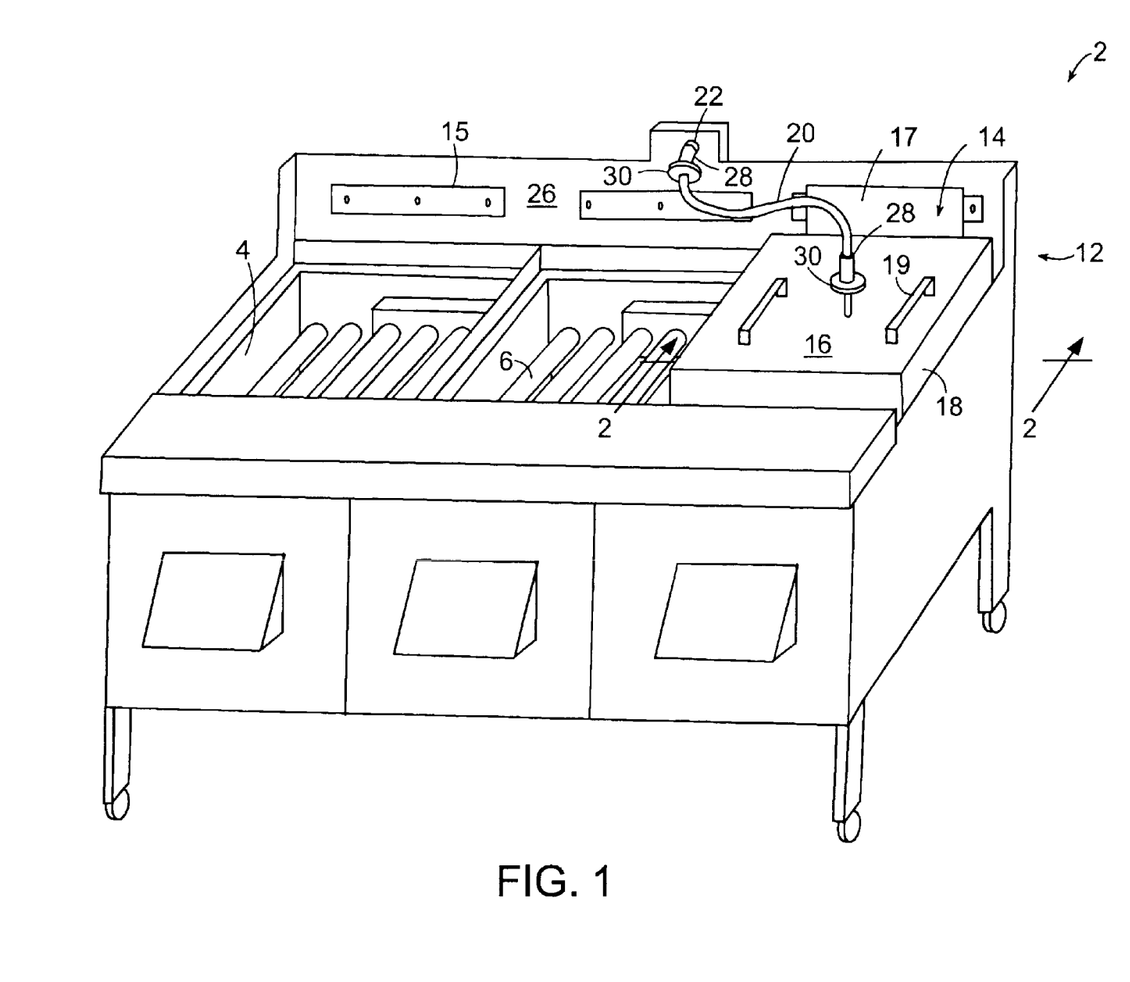
FIG. 1 is a schematic perspective view of a gas fryer including a spray apparatus according to the present invention.

Referring to FIG. 1, a deep fryer having a spray apparatus according to the present invention is shown generally by reference numeral 2. Deep fryer 2 has a plurality of vats 4, each of which holds shortening, oil, or other cooking medium, and contains within it a plurality of heat exchange tubes 6 for heating the shortening. A drain 8 having a shutoff valve 10 (seen in FIG. 2) is located at a lower surface of each vat 4. Spray apparatus 12 comprises a shroud or shield 14 having a top 16, and side walls 18 extending downwardly from outer edges of top 16. Basket hangers 15, from which baskets containing food product are suspended, are secured to rear wall 26 of fryer 2 above each vat 4. A bracket 17, which is secured to shield 14, is hooked over a basket hanger 15 to suspend spray apparatus 12 over a vat 4 in order to perform a cleaning operation. In another preferred embodiment, the lower edges of side walls 18 of shield 14 could rest on upper edges of side walls of vat 4 to support spray apparatus 12. A pair of handles 19 are preferably secured to top 16 to ease handling of spray apparatus 12.

A flexible conduit or hose 20 is connected at a first end to spray apparatus 12 and at a second end to a fluid supply port 22. Fluid supply port 22 is connected to a reservoir of shortening 24 (seen in FIG. 5) and is preferably located proximate an upper edge of rear wall 26 of fryer 2. A first male quick connect coupling 28, having an automatic shutoff valve therein, is connected to fluid supply port 22. A first female quick connect coupling 30 on the second end of hose 20 is detachably secured to the first quick connect coupling 28. A second male quick connect coupling 28 having an automatic shutoff valve therein is connected to the first end of hose 20. A second female quick connect coupling 30 is secured to spray apparatus 12. The second male quick connect coupling 28 is detachably connected to the second female quick connect coupling 30. The mating quick connect couplings are detachably secured to one another in a positive snap fit manner. A quick connect coupling with an automatic shutoff valve prevents fluid from flowing through the coupling unless a mating quick connect coupling is connected thereto. Thus, a mating pair of quick connect couplings provide a safe and efficient means of connecting devices without concern for the heated shortening flowing through an open fitting.

It is to be appreciated that an automatic shutoff valve may, in certain preferred embodiments, be alternatively provided in only the female quick connect couplings 30, or in both male quick connect couplings 28 and female quick connect couplings 30.

The embodiment illustrated in FIG. 1 shows deep fryer 2 having three vats 4. It is to be appreciated that deep fryer 2 may have a single vat 4 or any other number of vats 4, depending on the intended application and environmental requirements for deep fryer 2.

Figure 2:
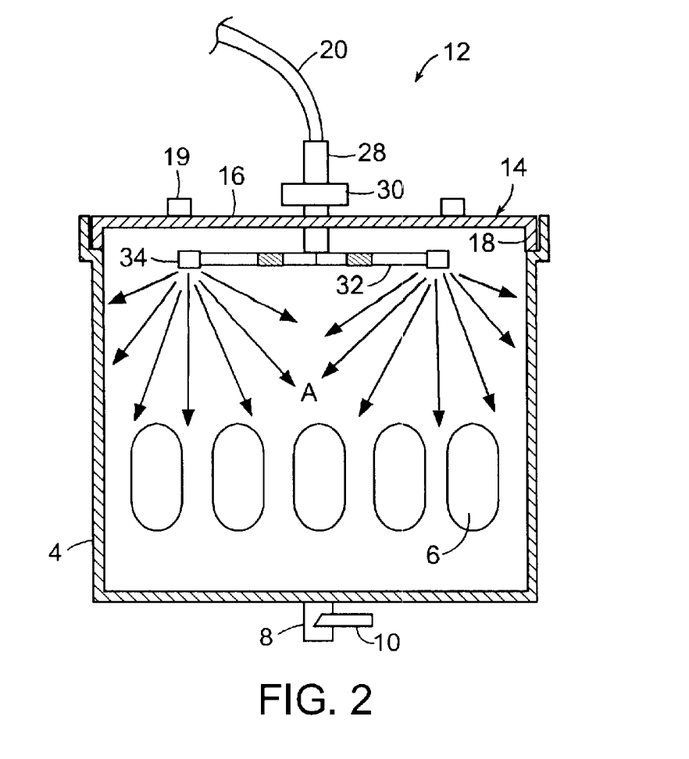
FIG. 2 is a schematic section view, taken along lines 2—2 of FIG. 1, showing shortening being sprayed by the spray apparatus into a vat of the gas fryer.

As seen more clearly in FIG. 2, spray apparatus 12 has a spray unit 32 connected to a female quick connect coupling 30 and from which a flow of shortening is dispensed into vat 4. Spray unit 32 has a plurality of nozzles 34 from which shortening advantageously projects outwardly and downwardly, as indicated by arrows A, thereby rinsing the walls of vat 4, the top and sides of heat exchange tubes 6 and the bottom of vat 4 as the shortening flows down into drain 8. The bottom of vat 4 is preferably sloped downwardly from a back wall toward a front wall into a trough in which drain 8 is located, as disclosed in commonly owned U.S. Pat. No. 6,182,561, entitled "Vat Bottom Configuration for Deep Fryer", filed on Oct. 22, 1999, the entire specification of which is hereby incorporated by reference for all purposes.

Figure 3:
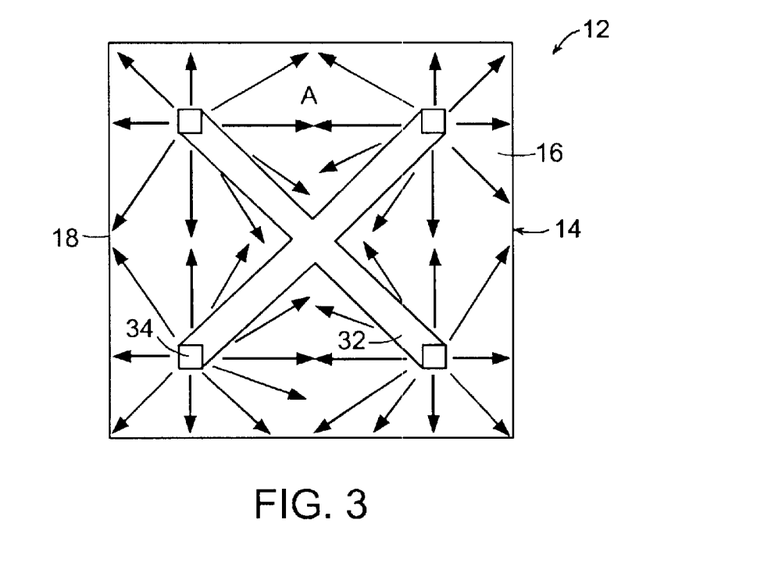
FIG. 3 is a schematic plan view, looking upwardly at the spray apparatus of FIG. 1, and showing a spray pattern of shortening dispensed by the spray apparatus.

In certain preferred embodiments, as seen in FIG. 3, spray unit 32 has four nozzles 34, each of which discharges shortening downwardly and outwardly into vat 4. In the illustrated embodiment, each nozzle 34 has a substantially square spray pattern, such that the spray from all of the nozzles 34 combines to substantially cover the walls, floor and heat exchange tubes 6 of vat 4. Nozzles 34, in other preferred embodiments, may have different shaped spray patterns such as circular, rectangular, or any other suitable shape which provides a spray pattern of shortening to substantially cover the walls and floor of vat 4 as well as the top and sides of heat exchange tubes 6.

Figure 4:
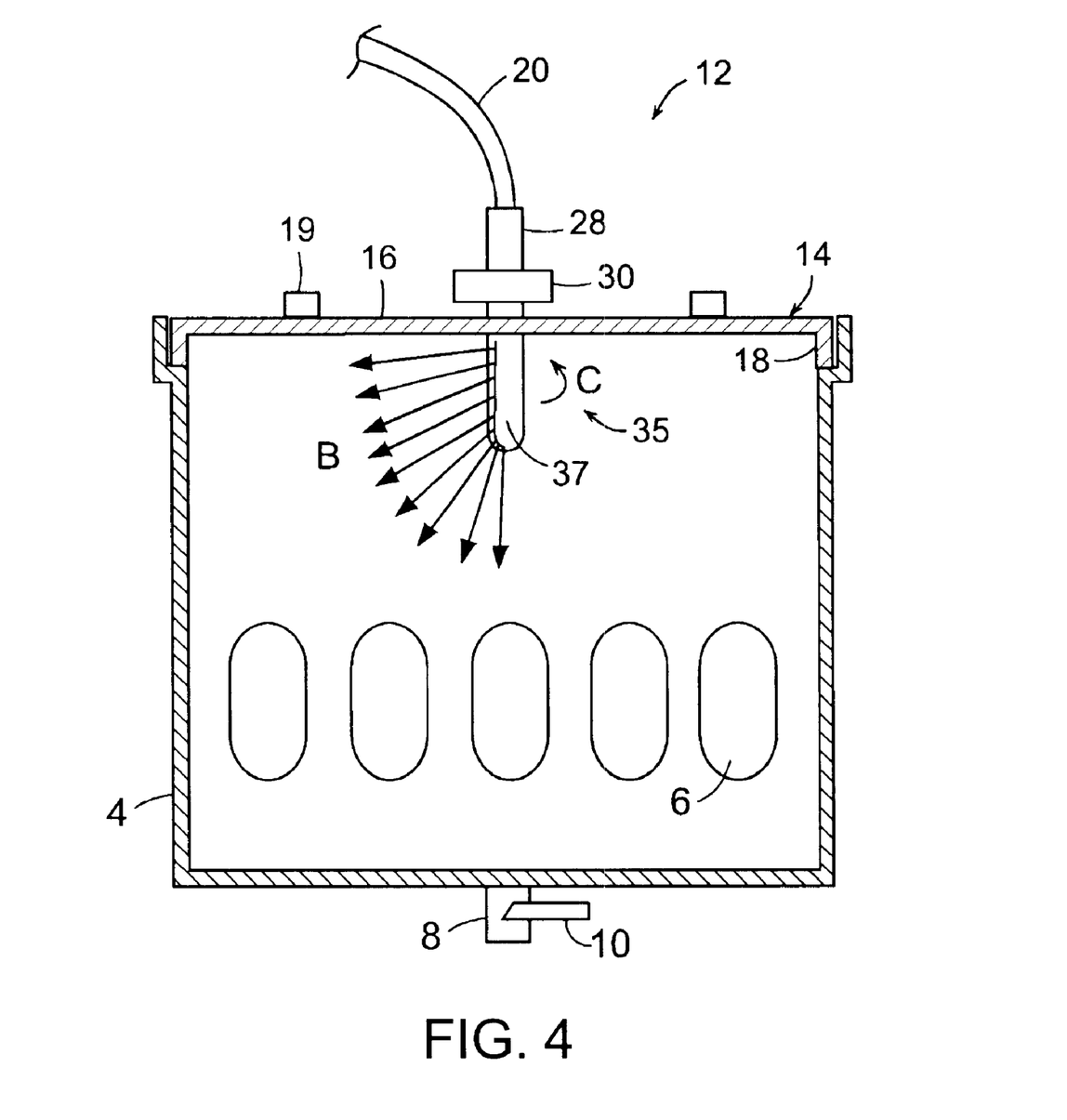
FIG. 4 is a schematic section view of an alternative embodiment of a spray nozzle of the spray apparatus of FIG. 1.

In another preferred embodiment, shown in FIG. 4, spray unit 35 comprises a single keg washer nozzle 37. Keg washer nozzle 37 directs a substantially planar sheet of shortening, as shown by arrows B, outwardly and downwardly toward the side walls and bottom of vat 4 and the top and sides of heat exchange tubes 6. The flow of shortening through keg washer nozzle 37 causes it to rotate, as shown by arrow C, so that the planar sheet of shortening advances around the interior of vat 4 as the shortening is discharged.

In other preferred embodiments, spray unit 32 may have any other suitable style or number of nozzles which allows shortening to be sprayed onto the side walls and floor of vat 4 as well as onto the top and sides of heat exchange tubes 6.

Figure 5:
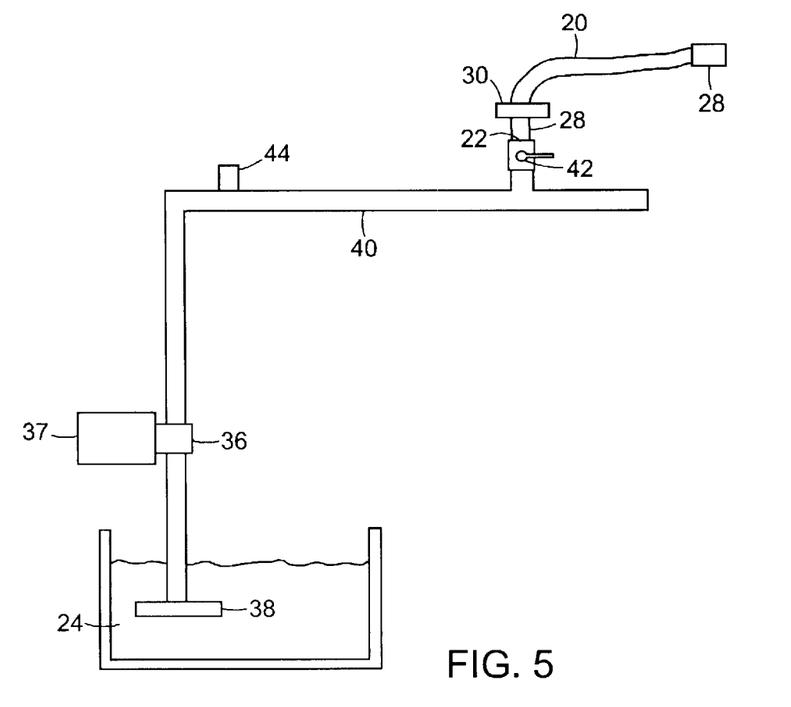
FIG. 5 is a schematic representation of the flow of shortening from a reservoir to a coupling of the spray apparatus of FIG. 1.

Turning now to FIG. 5, the supply of shortening to fluid supply port 22 will now be described. Pump 36, powered by motor 37, draws shortening from reservoir 24 through filter 38 and passes it through conduit 40 to fluid supply port 22. In certain preferred embodiments, a valve 42, including a microswitch 43 (seen in FIG. 6), is provided at fluid supply port 22 for manual shutoff. Pressure switch 44 is provided in conduit 40 to detect a high pressure condition. Upon detection of a predetermined high pressure level by pressure switch 44, motor 37 is deactivated, stopping the flow of shortening. In a situation where spray apparatus 12, or another suitable device such as a hose, is not connected to coupling 28, and pump 36 is turned on, pressure will build within conduit 40 until pressure switch 44 senses a predetermined pressure level and pump 36 is deactivated.

Figure 6:
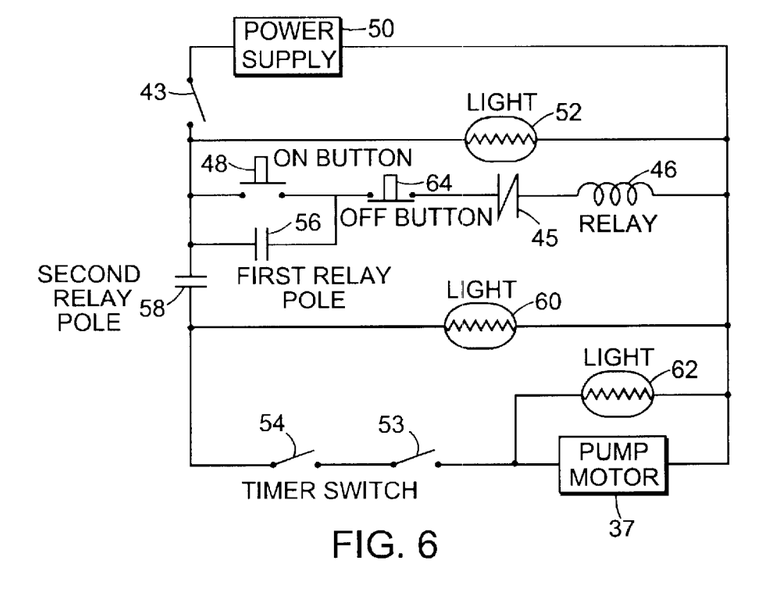
FIG. 6 is an electrical schematic of a first embodiment of the spray apparatus of FIG. 1.
Figure 7:
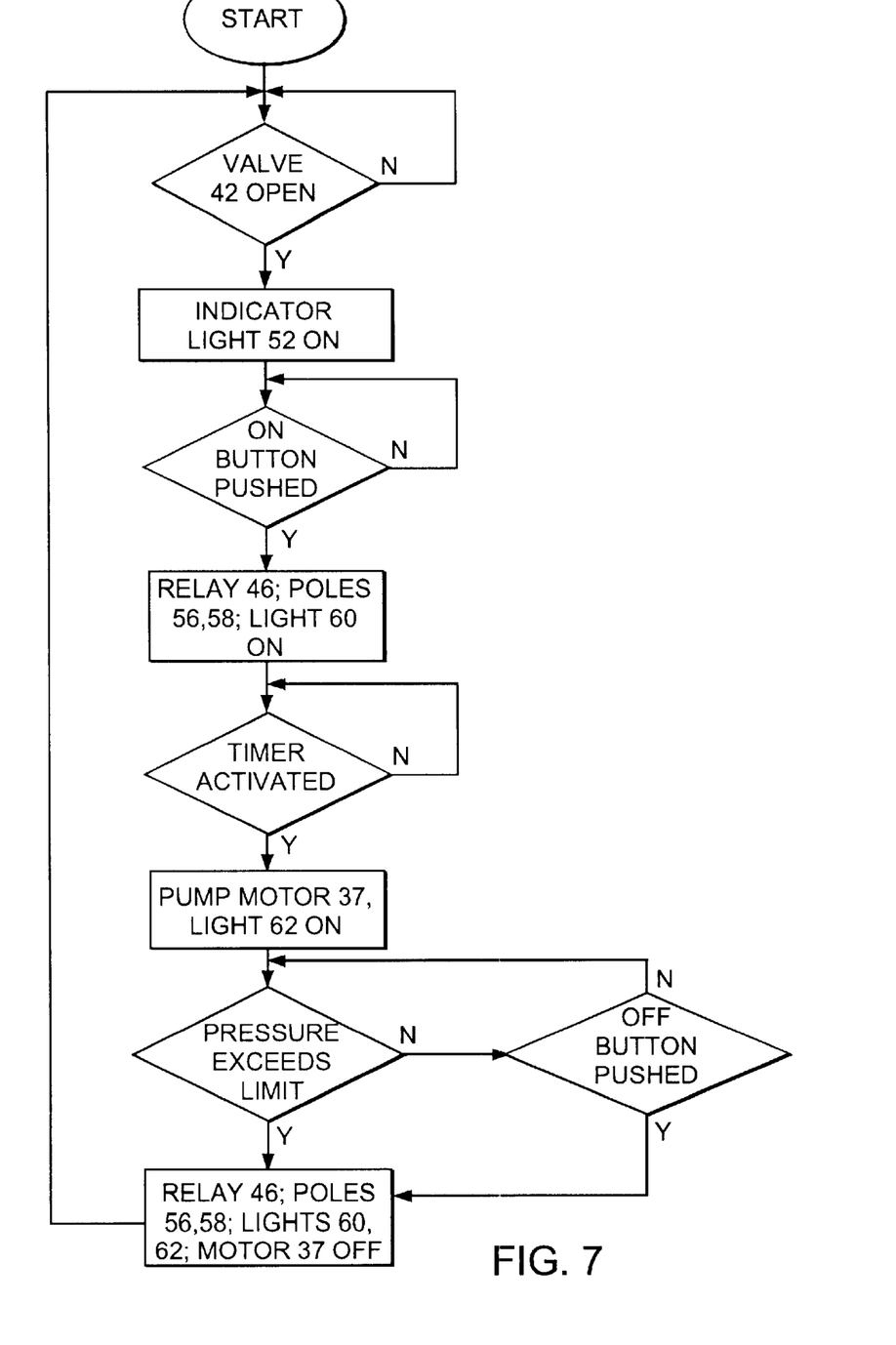
FIG. 7 is a flow chart describing the first embodiment of FIG. 1.

As shown and described in FIGS. 6, 7, to avoid the ensuing pressure drop in conduit 40 turning pump 36 back on, and resulting in a subsequent oscillating on-off situation, contacts 45 of pressure switch 44 are used in series with a relay holding coil 46, which includes first and second relay poles 56, 58, to maintain pump motor 37 in its deactivated state until a spring-loaded on button 48 is depressed. As a safety precaution, in order for power to be sent from power supply 50 to pump motor 37, valve 42 in shortening conduit 40 must be open. Therefore, microswitch 43 must be closed in order for power to be sent to pump motor 37. When microswitch 43 is closed, indicator light 52 is illuminated, indicating that valve 42 is open and pump motor 37 may be activated.

In certain preferred embodiments, a microswitch 53 (shown schematically in FIG. 6) is provided on one of an upper edge of vat 4 or shield 14. Microswitch 53 is normally open, and is in a closed condition only when shield 14 is in place on vat 4. Thus, the power supply circuit for pump motor 37 will not be complete, and shortening will not flow through spray apparatus 12, unless shield 14 is in place on vat 4.

In certain preferred embodiments, timer switch 54 is provided, allowing pump 36 to be activated for only a preselected time interval. When valve 42 is open, spray apparatus 12 is connected to coupling 28, and on button 48 is depressed, relay holding coil 46 is activated, closing the contacts of first relay pole 56 and second relay pole 58. At this point, indicator light 60 is activated, indicating that power is available for pump motor 37. When timer switch 54 is closed and shield 14 is in place closing microswitch 53, pump motor 37 is energized and pump 36 will run until the preselected time interval expires, at which point timer switch 54 opens, turning pump motor 37 off. When pump motor 37 is running, indicator light 62 is illuminated. If spray apparatus 12 is not connected to coupling 28 and pump motor 37 is energized, pressure will build up in conduit 40 until it reaches a predetermined level, at which point pressure switch 44 will open normally closed contacts 45, deactivating pump motor 37. As indicated above, in order for pump motor 37 to be re-energized, on button 48 must be depressed so that power can be supplied to relay coil 46 to close the contacts of first and second poles 56, 58. Off button 64 is also provided in order to manually shut off pump motor 37 at any time.

Figure 8:
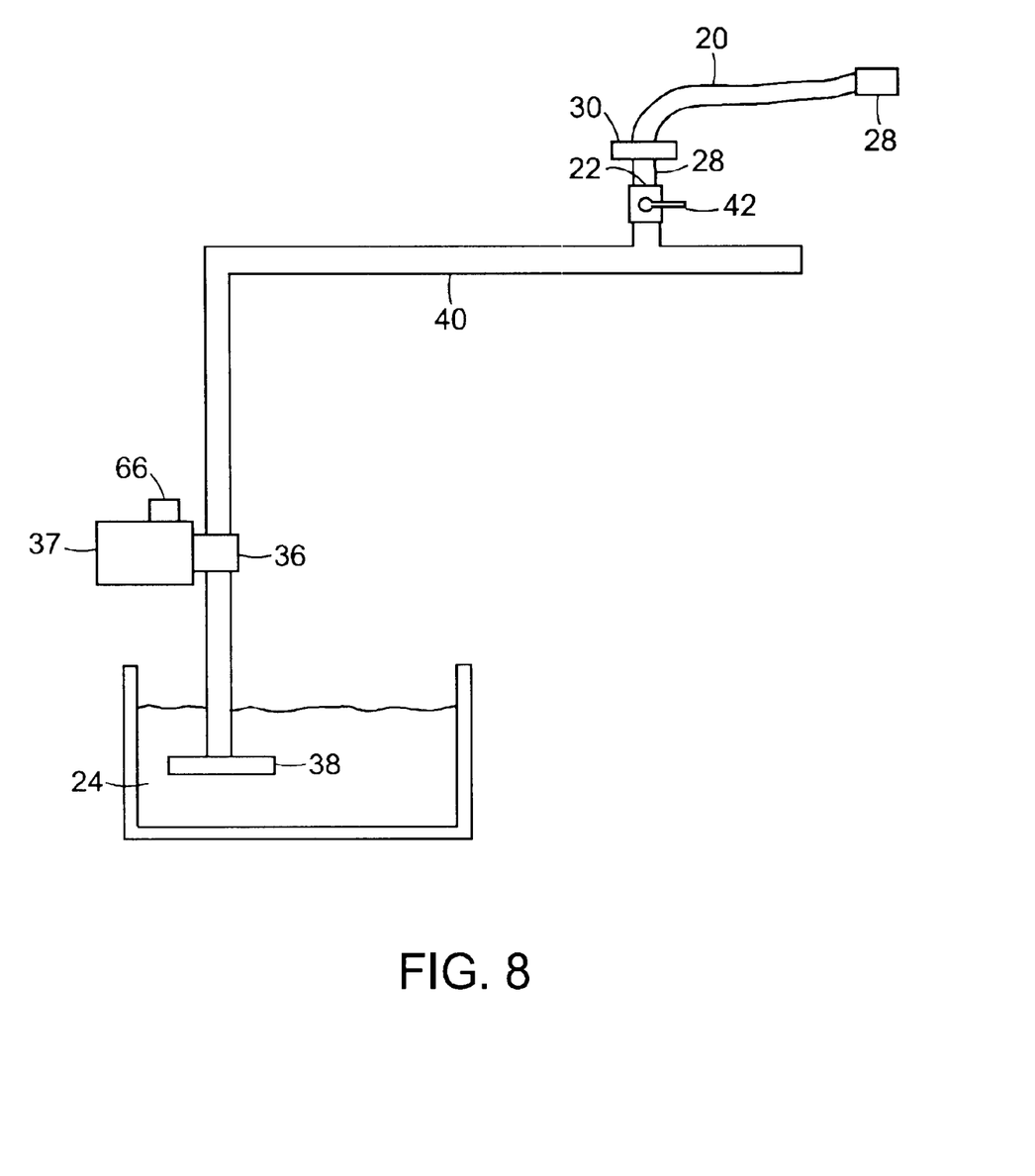
FIG. 8 is a schematic representation of the flow of shortening from a reservoir to a coupling of a second embodiment of the spray apparatus of FIG. 1.
Figure 9:
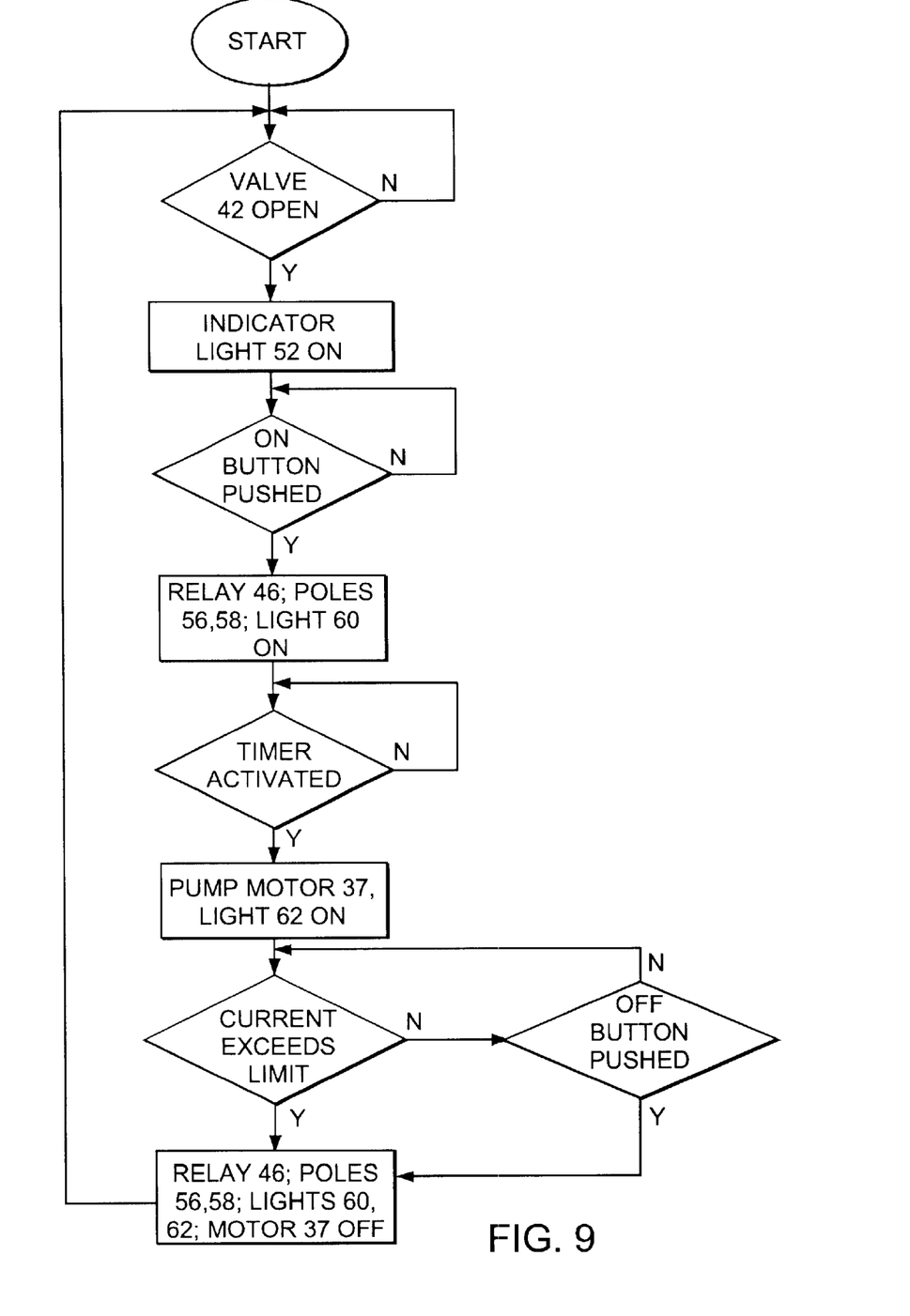
FIG. 9 is a flow chart describing the second embodiment of FIG. 8.

In another preferred embodiment, shown and described in FIGS. 8, 9, current detector 66 is provided on pump motor 37 to indicate when a high current condition exists. Normally closed contacts 45 are opened when current detector 66 senses a predetermined high current level. Thus, if spray apparatus 12, or another suitable fluid flow device, is not connected to coupling 28, and pump motor 37 is energized, pump motor 37 will begin to draw higher than normal current due to the increased pressure condition in conduit 40. When the current reaches the predetermined high level, current detector 66 opens contacts 45, shutting off power to, and, thus, protecting, pump motor 37.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

What is claimed is:

1. A spray apparatus for a fryer system comprising, in combination:
    a vat having four sides and a bottom;
    a plurality of heat exchange tubes extending across the vat;
    a fluid supply port operably connected to a supply of fluid; and
    a spray unit having at least one nozzle disposed above the plurality of heat exchange tubes and operably connected to the fluid supply port, the spray unit oriented to direct a flow of fluid onto the sides and bottom of the vat and onto a top and all sides of substantially all of the heat exchange tubes.

2. The spray apparatus of claim 1, wherein the spray unit has four nozzles, each nozzle oriented to direct a flow of fluid onto the sides and bottom of the vat and onto the heat exchange tubes.

3. The spray apparatus of claim 2, wherein each of the four nozzles has a substantially square spray pattern.

4. The spray apparatus of claim 1, wherein the spray unit is oriented to direct a flow of fluid onto a top and sides of the heat exchange tubes.

5. The spray apparatus of claim 1, wherein each nozzle is oriented to direct a substantially planar sheet of fluid and is adapted to rotate as fluid passes through the nozzle.

6. The spray apparatus of claim 5, wherein the plane of the sheet of fluid is oriented substantially vertically.

7. The spray apparatus of claim 1, further comprising a shield positioned above the spray unit to substantially prevent fluid from spraying out of the vat during operation of the spray unit.

8. The spray apparatus of claim 1, further comprising a pump having a power supply and being operably connected to the fluid supply.

9. The spray apparatus of claim 8, further comprising a pressure detection switch responsive to a predetermined high pressure condition of a supply of fluid to deactivate the pump.

10. A spray apparatus for a fryer system comprising, in combination:
    a vat having four sides and a bottom;
    a fluid supply port operably connected to a supply of fluid;
    a spray unit having at least one nozzle disposed above the plurality of heat exchange tubes and operably connected to the fluid supply port, the spray unit oriented to direct a flow of fluid onto the sides and bottom of the vat;
    a pump having a power supply and being operably connected to the fluid supply;
    a shield connected to the spray unit to substantially prevent fluid from spraying out of the vat during operation of the spray unit when the shield is properly positioned above the vat; and
    a switch operably connected in series with the power supply of the pump, the switch being in a closed condition when the shield is properly positioned above the vat.

11. A spray apparatus for a fryer system comprising, in combination:
    a vat having four sides and a bottom;
    a fluid supply port operably connected to a supply of fluid;
    a spray unit having at least one nozzle disposed above the plurality of heat exchange tubes and operably connected to the fluid supply port, the spray unit oriented to direct a flow of fluid onto the sides and bottom of the vat;
    a pump having a power supply and being operably connected to the fluid supply;
    a pressure detection switch responsive to a predetermined high pressure condition of a supply of fluid to deactivate the pump;
    a relay coil connected in series with the pressure detection switch; and
    a manual switch to restore power to the pump after the pump has been deactivated by the pressure detection switch.

12. A spray apparatus for a fryer system comprising, in combination:
    a vat having four sides and a bottom;
    a fluid supply port operably connected to a supply of fluid;
    a spray unit having at least one nozzle disposed above the plurality of heat exchange tubes and operably connected to the fluid supply port, the spray unit oriented to direct a flow of fluid onto the sides and bottom of the vat;
    a pump having a power supply and being operably connected to the fluid supply; and
    a timer switch to deactivate the pump after a predetermined time period has elapsed.

13. A spray apparatus for a fryer system comprising, in combination:
    a vat having four sides and a bottom;
    a fluid supply port operably connected to a supply of fluid;
    a spray unit having at least one nozzle disposed above the plurality of heat exchange tubes and operably connected to the fluid supply port, the spray unit oriented to direct a flow of fluid onto the sides and bottom of the vat;

a pump having a power supply and being operably connected to the fluid supply;

a manual valve to control a flow of fluid to the fluid supply port; and a switch in series with a power supply circuit of the pump and operably connected to the manual valve, the switch being in an open condition when the manual valve is closed and in a closed condition when the manual valve is open.

14. A spray apparatus for a fryer system comprising, in combination:

a vat having four sides and a bottom;

a fluid supply port operably connected to a supply of fluid;

a spray unit having at least one nozzle disposed above the plurality of heat exchange tubes and operably connected to the fluid supply port, the spray unit oriented to direct a flow of fluid onto the sides and bottom of the vat;

a pump having a power supply and being operably connected to the fluid supply; and a current detection switch responsive to a predetermined high current condition in a power supply circuit of the pump to deactivate the pump.

15. The spray apparatus of claim 14, further comprising:

a relay coil connected in series with the current detection switch; and a manual switch to restore power to the pump after the pump has been deactivated by the current detection switch.

16. A spray apparatus for a fryer system comprising, in combination:

a vat having four sides and a bottom;

a fluid supply port operably connected to a supply of fluid;

a spray unit having at least one nozzle disposed above the plurality of heat exchange tubes and operably connected to the fluid supply port, the spray unit oriented to direct a flow of fluid onto the sides and bottom of the vat; and a quick connect coupling having an automatic shutoff valve and being connected to the fluid supply port to prevent flow of fluid from the fluid supply port unless a mating coupling is connected to the quick connect coupling.

17. A spray apparatus for a fryer system comprising, in combination:

a plurality of vats, each vat having four sides and a bottom;

a plurality of heat exchange tubes extending across each vat;

a fluid supply port operably connected to a supply of fluid; and a spray unit operably connected to the fluid supply port and having at least one nozzle, the spray unit adapted to be positioned above a selected vat to direct a flow of fluid onto the sides and bottom of the selected vat and onto a top and all sides of substantially all of the heat exchange tubes of the selected vat.

* * * * *